(12) United States Patent
Zelivansky et al.

(10) Patent No.: US 12,335,290 B2
(45) Date of Patent: Jun. 17, 2025

(54) AUTOMATED MATCHING OF VULNERABILITY DATA BETWEEN VULNERABILITY FEEDS

(71) Applicant: Palo Alto Networks, Inc., Santa Clara, CA (US)

(72) Inventors: Ariel M. Zelivansky, Mountain View, CA (US); Sharon Ben Zeev, Tel Aviv (IL); Shaul Ben Hai, Petah Tikva (IL); Liron Levin, Kefar Sava (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 195 days.

(21) Appl. No.: 17/804,719

(22) Filed: May 31, 2022

(65) Prior Publication Data
US 2023/0388330 A1 Nov. 30, 2023

(51) Int. Cl.
*H04L 9/40* (2022.01)
(52) U.S. Cl.
CPC ............... *H04L 63/1433* (2013.01)
(58) Field of Classification Search
CPC ............................. H04L 63/1433
See application file for complete search history.

(56) References Cited

U.S. PATENT DOCUMENTS

| 11,516,222 | B1* | 11/2022 | Srinivasan | G06F 21/577 |
| 2014/0259095 | A1 | 9/2014 | Bryant | |
| 2018/0018465 | A1* | 1/2018 | Carey | G06F 21/50 |
| 2020/0396241 | A1* | 12/2020 | Crabtree | H04L 63/1433 |
| 2022/0210202 | A1* | 6/2022 | Crabtree | G06F 16/2477 |

OTHER PUBLICATIONS

Jiang, et al., "Evaluating the Data Inconsistency of Open-Source Vulnerability", ARES 2021: The 16th International Conference on Availability, Reliability and Security, Aug. 2021, Article No. 86, pp. 1-10.

* cited by examiner

*Primary Examiner* — Khoi V Le
(74) *Attorney, Agent, or Firm* — Gilliam IP PLLC

(57) ABSTRACT

A system has been designed that examines details of a security advisory against informal vulnerability records. The system generates a vulnerability match confidence value based on comparison of different details in the security advisory against the informal vulnerability records. Based on the comparisons, the system determines similarity of different details between the security advisory and the informal vulnerability records and cumulatively updates a vulnerability match confidence value with various detail similarity weights according to the determined similarities. Based on the vulnerability match confidence value, the system can classify or designate a security advisory for automatic merging or for manual examination. This reduces the burden on cybersecurity personnel and allows cybersecurity personnel to focus their limited resources on analyzing new vulnerabilities.

20 Claims, 7 Drawing Sheets

AUTOMATED MATCHING OF VULNERABILITY DATA BETWEEN VULNERABILITY FEEDS

BACKGROUND

The disclosure generally relates to network architectures or network communication protocols for network security (e.g., H04L 63/00) and electrical digital data processing (e.g., G06F 2207).

The CVE® program is an international, community-driven effort to catalog vulnerabilities in accordance with established guidelines and rules. The community includes government organizations, corporations, industry trade groups, and an open intelligence community. The United States government provides the National Vulnerabilities Database (NVD) through the National Institute of Standards and Technology (NIST). The U.S. Department of Homeland Security (DHS) Cybersecurity and Infrastructure Security Agency (CISA) sponsors the CVE® program.

The glossary of the CVE® program defines a vulnerability as "A flaw in a software, firmware, hardware, or service component resulting from a weakness that can be exploited, causing a negative impact to the confidentiality, integrity, or availability of an impacted component or components." When a vulnerability is discovered, it is reported to a CVE program participant. The participant requests a CVE identifier (CVE ID) from a CVE Numbering Authority (CNA) which reserves a CVE record. Details about the vulnerability are collected and submitted for evaluation. If the submitted details satisfy the minimum required information, the CVE record is published to the CVE list.

BRIEF DESCRIPTION OF THE DRAWINGS

Embodiments of the disclosure may be better understood by referencing the accompanying drawings.

DESCRIPTION

Figure 1:
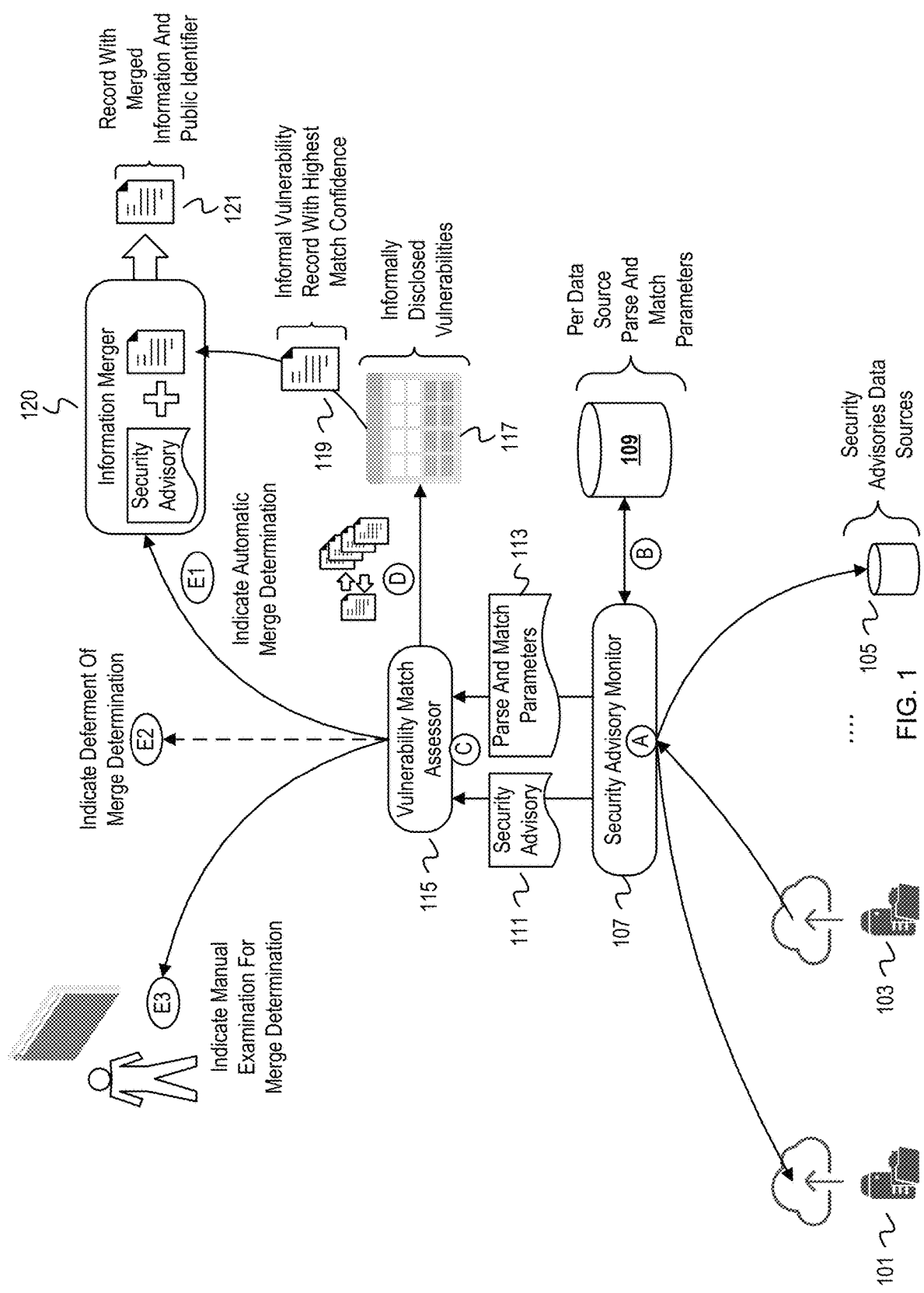
FIG. 1 is a diagram of a system that determines merge directives for security advisories with respect to informal vulnerabilities.

The description that follows includes example systems, methods, techniques, and program flows that embody aspects of the disclosure. However, it is understood that this disclosure may be practiced without these specific details. For instance, this disclosure refers to assessing similarity of information in a security advisory and a listing of vulnerability records. Aspects of this disclosure can be used to assess similarity of public security advisories of different communities and/or different publishing standards. In other instances, well-known instruction instances, protocols, structures and techniques have not been shown in detail in order not to obfuscate the description.

A cybersecurity provider may maintain vulnerability information for vulnerabilities not yet formally disclosed. Formal disclosure of a vulnerability conforms to a community adopted process that governs publishing vulnerability information. While not yet formally disclosed, a vulnerability may be publicly discussed (e.g., discussion on a board or thread maintained by the GitHub® service, discussed in a bug bounty program, etc.). Cybersecurity personnel will analyze the vulnerability to understand the vulnerability and create/revise vulnerability metadata (e.g., vulnerability description, affected packages and versions, severity, etc.) based on their analysis and the public discussions before reporting to customers. The cybersecurity provider may then report information about these informally disclosed vulnerabilities to customers along with published security advisories from various sources (e.g., the CVE List, NVD, Red Hat® Security Advisories, etc.) as part of a vigilant cybersecurity service. To track these informally disclosed vulnerabilities, identifiers are assigned that do not conform to the community adopted process (e.g., not a CVE ID). Eventually, a security advisory for a vulnerability that has been informally disclosed will likely publish according to the formal disclosure process. To prevent duplication of information and provide customers coherent information that can be efficiently consumed, the cybersecurity provider merges pre-publication vulnerability information with corresponding published vulnerability information. However, this merging is a manually intensive task for cybersecurity personnel.

A system has been designed that examines details of a security advisory against vulnerability records of informally disclosed vulnerabilities ("informal vulnerability records"). The system generates a vulnerability match confidence value based on comparison of different details in the security advisory against information in the informal vulnerability records. Based on the comparisons, the system determines similarity of different details between the security advisory and the informal vulnerability records and cumulatively updates a vulnerability match confidence value with various detail similarity weights according to the determined similarities. Based on the vulnerability match confidence value, the system can classify or designate a security advisory for automatic merging or for manual examination. This reduces the burden on cybersecurity personnel and allows cybersecurity personnel to focus their limited resources on analyzing vulnerabilities for solutions.

Example Illustrations

FIG. 1 is a diagram of a system that determines merge directives for security advisories with respect to informal vulnerability records. The system illustrated in FIG. 1 includes a security advisory monitor 107, a vulnerability match assessor 115, an information merger 120, and a repository 109 of per data source parse and match parameters. The system detects a published security advisory, compares the security advisory against a list of informally disclosed vulnerabilities, and generates a directive for merging the security advisory with information of one of the informally disclosed vulnerabilities. In this example illustration, the security advisory monitor 107 monitors multiple, different security advisories data sources, which include data sources 101, 103, 105. These are depicted to illustrate that monitoring may involve obtaining security advisories published to a remote location (e.g., obtaining from a publish location of data source 101), receiving security advisories (e.g., receiving a message from data source 103), and accessing a data source (e.g., periodically reading a changelog of a database at data source 105).

FIG. 1 is annotated with a series of letters A-D and E1-E3. These stages represent stages of operations. Each of the stages E1-E3 represent a different outcome directive depending upon the preceding stages. Although these stages are ordered for this example, the stages illustrate one example to aid in understanding this disclosure and should not be used to limit the claims. Subject matter falling within the scope of the claims can vary with respect to the order and some of the operations.

At stage A, the security advisory monitor 107 detects a security advisory published from one of the data sources 101, 103, 105. As stated previously, detection of a security advisory may be detecting receipt of a notification, detecting posting of the security advisory to a publicly accessible location, or detecting a change in changelog or database. A security advisory can be an initial publication of information about a vulnerability, an update that provides new information to the public about the vulnerability, or an update that changes public information about a vulnerability.

At stage B, the security advisory monitor 107 loads parse and match parameters from the repository 109 based on which data source provided the detected security advisory. Organizations that maintain and/or manage the data sources 101, 103, 105 may have different layouts/schemas, different content requirements for publication, etc. In addition, an organization may provide a security advisory in different formats. For example, a security advisory may be published according to the JavaScript® Object Notion (JSON) format and according to an eXtensible Markup Language (XML) format. Thus, the security advisory monitor 107 retrieves from the repository 109 parameters that guide parsing a security advisory and match assessment of the security advisory. The parameters can be indexed by data source identifier and/or an attribute(s) of the security advisory. For instance, a security advisory can include header fields identifying a data file format, version, etc.

At stage C, the security advisory monitor 107 communicates a security advisory 111 and parse and match parameters 113 to a vulnerability match assessor 115. The vulnerability match assessor 115 uses the parameters 113 to locate and read content of the security advisory 111 for match assessment.

At stage D, the vulnerability match assessor 115 compares the content of the security advisory 111 to informally disclosed vulnerabilities in a listing 117 of informally disclosed vulnerabilities to determine whether information from the security advisory 111 can be merged with information from an informal vulnerability record in the listing 117. The vulnerability match assessor 115 is comparing content to determine whether the security advisory 111 describes a vulnerability that is also described in the listing 117. With the parameters 113, the vulnerability match assessor 115 determines mappings of details or fields of the security advisory 111 and the informal vulnerability records in the listing 117 to compare and determine degree of similarity. Different fields can have different rules for determining degree of similarity and different weights. The vulnerability match assessor 115 accumulates weights in match confidence variables for the informal vulnerability records based on the comparisons.

Based on the resulting values of the match confidence variables, the vulnerability match assessor 115 will perform operations of one of the stages E1-E3. At stage E1, the vulnerability match assessor 115 indicates to the information merger 120 the security advisory 111 and an informal vulnerability record 119 with a highest match confidence for merging. After comparing the content of the security advisory 111 and the informal vulnerability records in the listing 117, the vulnerability match assessor 115 determines whether at least one informal vulnerability record has a match confidence variable with a value that satisfies a defined automated merge threshold. The information merger 120 then creates a new record or updates an existing record to generate a record 121 that includes merged information and the public vulnerability identifier from the security advisory 111. The generated record 121 can be inserted into another repository for merged vulnerability records and/or published as a security advisory updating the public information for the vulnerability identified by the security advisory 111.

At stage E3, the vulnerability match assessor 115 indicates the security advisory 111 for manual examination to determine whether information from the security advisory 111 can be merged with information of one of the informal vulnerability records. The vulnerability match assessor 115 proceeds to stage E3 if none of the informal vulnerability records have a match confidence variable with a value that satisfies the automated merge threshold.

Embodiments may use an additional match assessment category to defer a final merge directive for a security advisory. Multiple updates about a vulnerability can occur in a short time frame (e.g., a few hours). To address this scenario, embodiments may defer indicating manual examination in case a subsequent advisory(ies) within a time window will provide additional information that leads to satisfying the automated merge threshold. At stage E2, the vulnerability match assessor 115 indicates deferment of a merge determination for the security advisory 111. In this scenario, the match confidence variable of at least one informal vulnerability record for the security advisory 111 exceeds a manual examination threshold but does not satisfy the automated merge threshold. The vulnerability match assessor 115 can insert the security advisory 111 into a queue, for example, of security advisories for re-assessment. If a new security advisory for the same vulnerability is detected, then the system can assess the new security advisory and discard the queued security advisory 111. This prevents resources being expended on manual examination of the security advisory. If a new security advisory is not received before lapse of a defined time period (e.g., 12 hours), then the vulnerability match assessor 115 indicates the security advisory 111 for manual examination.

Figure 2:
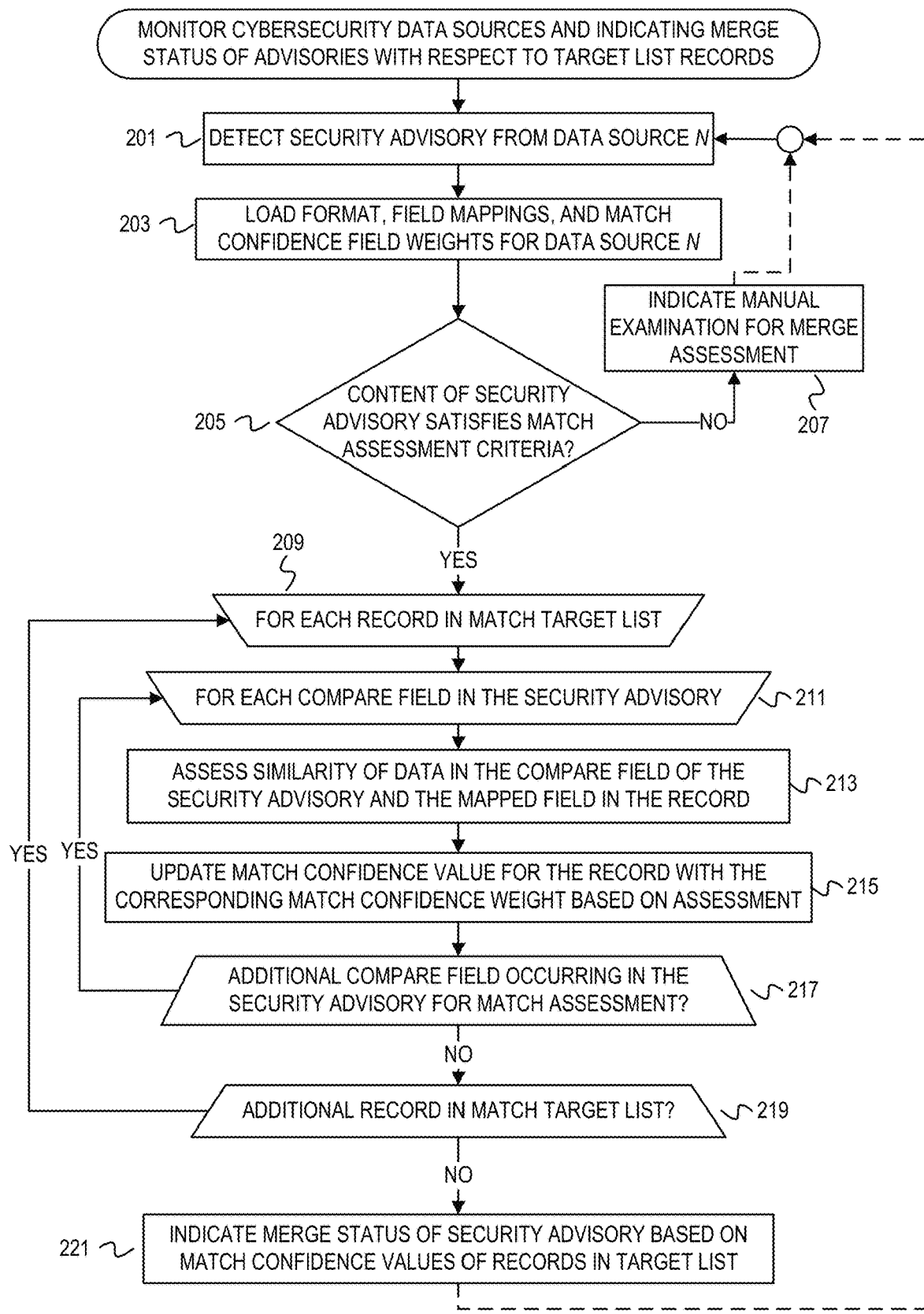
FIG. 2 provides example operations at a level including monitoring different data sources.
Figure 3:
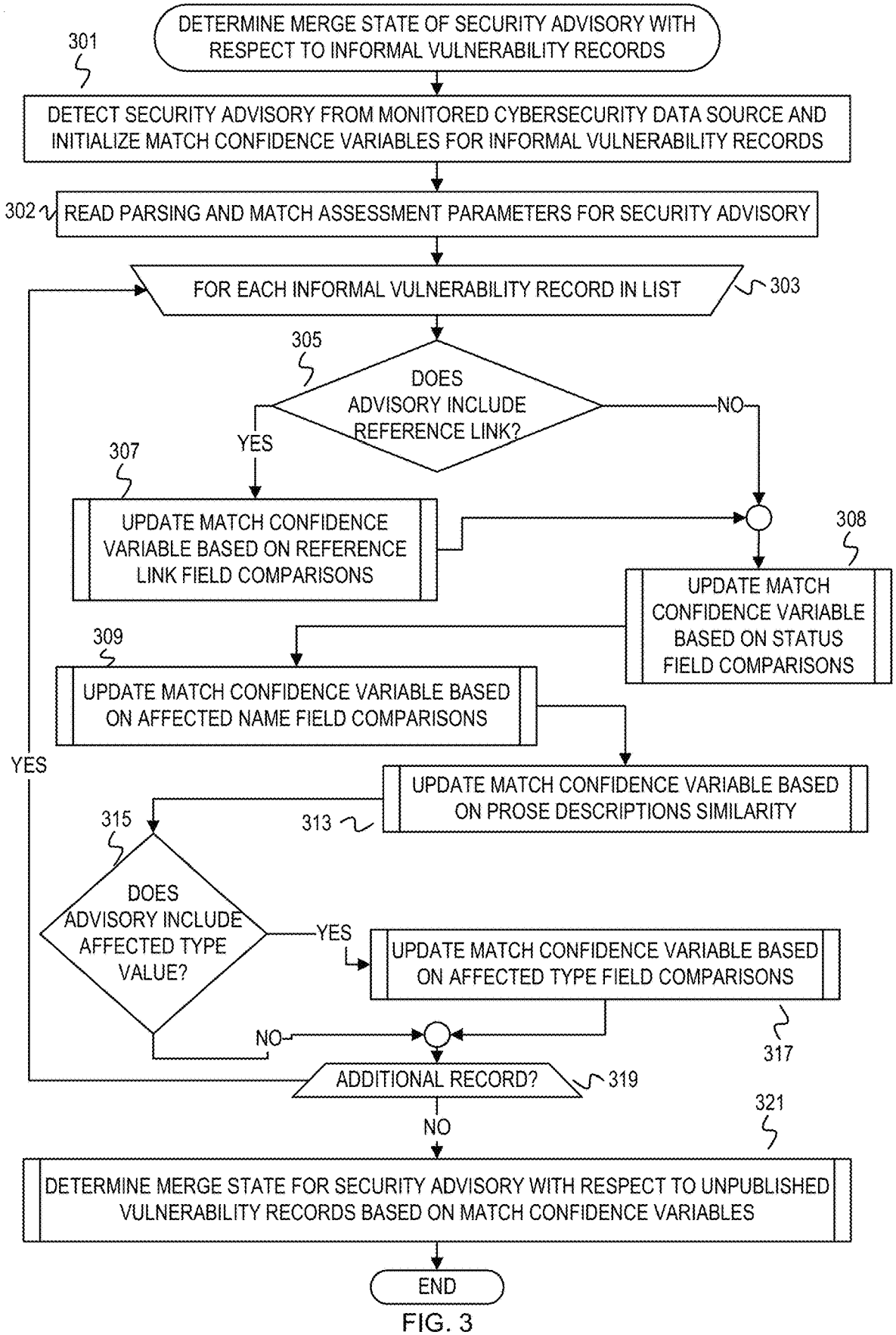
FIG. 3 is a flowchart of example operations for determining merge state of a security advisory with respect to informal vulnerability records.

FIGS. 2-6 are flowcharts for various aspects of the disclosed system. FIG. 2 provides example operations at a level including monitoring different data sources. FIG. 3 provides example operations that refers to specific fields being compared to further aid in understanding the disclosure. FIGS. 4A, 4B, 5A, 5B, and 6 provide example operations that elaborate on operations depicted in FIG. 3. The example operations are described with reference to named program code. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for monitoring cybersecurity data sources and indicating merge status for security advisories with respect to target list records. While FIG. 1 referred to a listing of informal vulnerability records, this disclosure may also be applied to vulnerabilities disclosed according to different formal processes. A "target list record" may be a record in a listing of informally disclosed vulnerabilities or a record in a listing of formally disclosed vulnerabilities identified according to a different identification scheme than used by the security advisory.

At block 201, a system detects a security advisory from a data source N. Presumably, the system monitors multiple data sources that publish security advisories according to different publication models/techniques and in different data formats. Monitoring the data sources can use a process or thread ("listener") that listens for security advisories from each data source and inserts detected security advisories into a queue for match assessment. If not indicated in the security advisory, a listener can associate metadata that identifies the data source with the security advisory. Another process/thread besides the listener can manage the queue.

At block 203, the system loads format, field mappings, and match confidence field weights for the data source N. Each data source being monitored can publish a security advisory in different data formats. To load a format that facilitates parsing the security advisory, the system can retrieve a list of data formats known to be used by the data source and then select the appropriate data format based on header information in the security advisory. In advance, mappings are determined between security advisory fields according to the loaded data format and fields of the target list records. Embodiments do not necessarily map all fields specified for a data format. Match confidence determination may rely on a subset of the fields in a security advisory. Thus, the mappings are likely limited to those fields compared to determine match confidence ("compare fields"). The compare fields are associated with match assessment rules and assigned weights.

At block 205, the system determines whether content of the security advisory satisfies match assessment criteria. The match assessment criteria specify compare fields to be compared and/or a quantity of fields with values in the security advisory. If the match assessment criteria are not satisfied, then operational flow proceeds to block 207. For instance, match assessment criteria can specify that a security advisory must have a reference link field and a prose description field and at least 3 of 5 optional compare fields. Otherwise, operational flow continues block 209.

At block 207, the system indicates the security advisory for manual examination for merge assessment. The system can set a flag or write the security advisory to a location that hosts security advisories awaiting manual examination. A dashed line from block 207 to block 201 illustrates that operational flow continues depending on when a next security advisory is detected.

At block 209, the system begins processing each record in the match target list. The match target list indicates vulnerabilities being tracked by a cybersecurity provider that have not yet been formally disclosed according to the process of the security advisory. In some cases, a record in the match target list may have insufficient content for match assessment. The system can filter or skip these records.

At block 211, the system begins processing each compare field in the security advisory with data. In some cases, a compare field may be present in a security advisory but lack data or be assigned an empty or null value.

At block 213, the system assesses similarity of data of the compare field of the security advisory and the mapped field in the record. Different compare fields can have different match assessment rules. For instance, a match assessment rule for a first field may condition accumulation of the corresponding weight on the data being identical to the mapped field. For a second field, the match assessment rule may specify different weights for different degrees of similarity of the data. FIG. 3 depicts example operations for specific fields.

At block 215, the system updates a match confidence variable for the record with the corresponding match confidence weight based on the assessment. The match confidence variable quantifies likelihood or confidence that the record and the security advisory describe a same vulnerability, thus leading to merging of the information. Assuming weights based on a match confidence scale from 0 to 1, the system can add 0.3 to the current value of the match confidence variable after determining match of a first field and add an additional 0.2 based on match of a second field.

At block 217, the system determines whether there is an additional compare field occurring in the security advisory for match assessment. If there is an additional compare field to assess, operational flow returns to block 211. Otherwise, operational flow proceeds to block 219.

At block 219, the system determines whether there is an additional record in the match target list to evaluate for match confidence. If there is an additional record in the match target list, then operational flow returns to block 209. Otherwise, operational flow proceeds to block 221.

At block 221, the system indicates merge status for the security advisory based on the match confidence values of records in the target list. If the record with the greatest match confidence satisfies threshold for automatic merger, then the data of the security advisory is merged with the data of the record. The resulting record is identified with the public identifier indicated in the security advisory. However, embodiments can configure the merger to preserve a vulnerability identifier of the match list record to allow accessing/retrieving of the information with different identifiers (e.g., a public identifier that conforms to a community standard and a public identifier that conforms to a proprietary identification scheme). If none of the records have a sufficient match confidence, then the system indicates the security advisory for manual examination to determine merge status. If the system implements a deferment threshold, then the system indicates the security advisory for deferred assessment until lapse of a time period.

FIG. 3 is a flowchart of example operations for determining merge state of a security advisory with respect to informal vulnerability records. FIG. 3 provides an example illustration that uses different fields for match assessment. The fields relied upon for the example operations of FIG. 3 include a reference link, affected name, prose description, and vulnerability type. Different data type formats will identify some fields in a security advisory differently. For instance, affected name refers to software (e.g., an application or a library file(s)) and/or hardware affected by the vulnerability. Across data type formats this information or field can be named as ecosystem, component, package, etc. Furthermore, FIG. 3 refers specifically to assessing similarity of content of a security advisory against content in a listing of informal vulnerabilities. Due to space constraints, some of the example operations are depicted in more detail in FIGS. 4A, 4B, 5A, 5B, and 6.

At block 301, a system detects a security advisory from a monitored cybersecurity data source for match assessment. Based on detection of the security advisory, the system initializes match confidence variable instances for records of informal vulnerabilities. The detected security advisory may already be validated as having sufficient information for match assessment or security advisories are not filtered for sufficient information.

At block 302, the system reads the parsing and match assessment parameters for the security advisory. As mentioned previously, the system monitors different data sources that provide security advisories in different data formats and different object types. The parsing and match assessment parameters can be read from data defined for the data source and/or metadata read from the security advisory. The match assessment parameters specify the compare fields of the security advisory and fields of the informal vulnerability records, rules or references to rules for comparing fields, and weights to assign based on the field comparisons. The match assessment parameters can also indicate or reference conditional processing for compare fields that are optional for the security advisory.

At block 303, the system begins assessing similarity of each record in a listing of informal vulnerabilities for determination of merge state. Implementations may process the listing according to different strategies. For instance, threads can be launched to perform match assessment of different sets of the informal vulnerability records concurrently. Records or record sets can be prioritized for match assessment based on a risk quantification. For example, scores based on the Common Weakness Scoring System (CWSS) or the Common Vulnerability Scoring System (CVSS) may be used to prioritize informal vulnerability records for assessment.

At block 305, the system determines whether the security advisory includes a reference link. A security advisory can be published with no reference links or multiple references link that direct to additional information. If the security advisory includes a reference link, operational flow continues to block 307. If not, then operational flow continues to block 308.

At block 307, the system updates the match confidence variable of the informal vulnerability record based on reference link comparisons. The system determines whether an informal vulnerability record includes a reference link identical to a reference link in the security advisory.

Figure 4A:
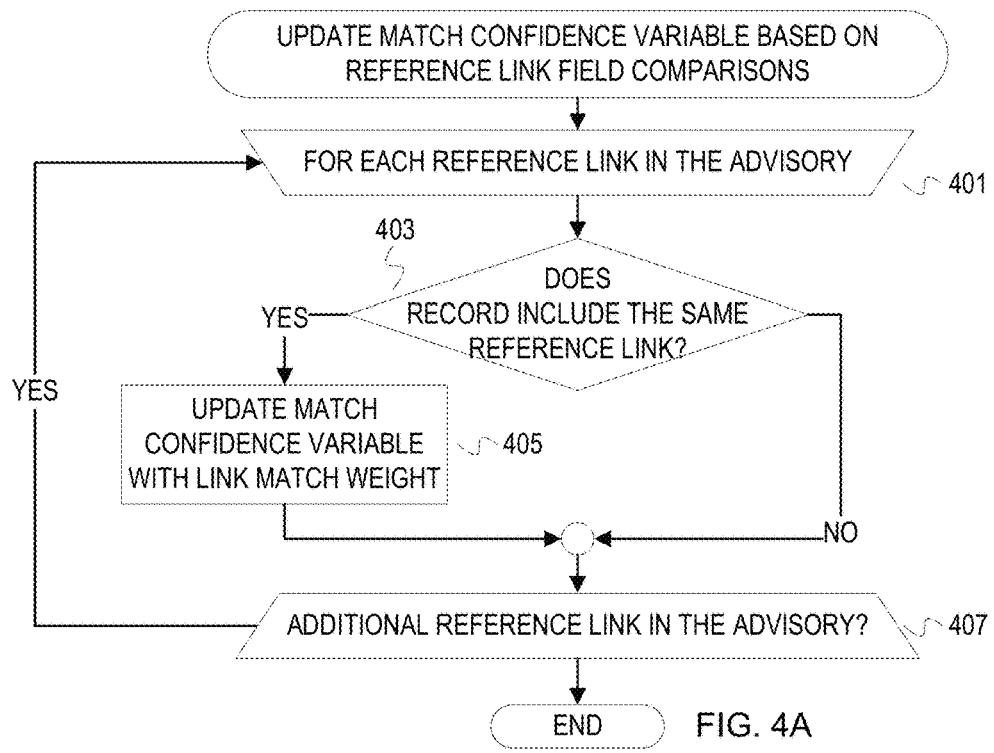
FIG. 4A depicts example operations for updating the match confidence variable based on reference link comparisons.

FIG. 4A depicts example operations for updating the match confidence variable based on reference link comparisons. At block 401, the system begins processing each reference link in the security advisory for match assessment against the currently selected informal vulnerability record. At block 403, the system determines whether the record includes the same reference link. In the case of reference link matching, the match assessment rule specifies that a satisfactory match is dependent upon an identical reference link. If the record includes multiple reference link fields with values (i.e., with reference links), then the system compares the reference link of the security advisory with each reference link of the record until a match is found or the record has been traversed. If the same reference link is not found in the record, then operational flow proceeds to block 407. If the same reference link is found in the record, then operational flow proceeds to block 405. At block 405, the system updates the match confidence variable of the currently selected informal vulnerability record with the link match weight. For instance, the system increments the match confidence variable with the link match weight. Due to the low likelihood of a same reference link being used for different vulnerabilities, the link match weight may be greater than the other match weights. Also, embodiments can implement a progression scheme that accounts for multiple link matches without this single compare field overwhelming the other compare fields. At block 407, the system determines whether there is another reference link in the security advisory to assess. If so, operational flow returns to block 401. Otherwise, the system continues to assess the next compare field, which occurs at block 309 in this example illustration.

At block 308, the system updates the match confidence variable of the informal vulnerability record based on vulnerability status comparisons. A security advisory may indicate a status of fixed, open, safe, or a fix version.

Figure 4B:
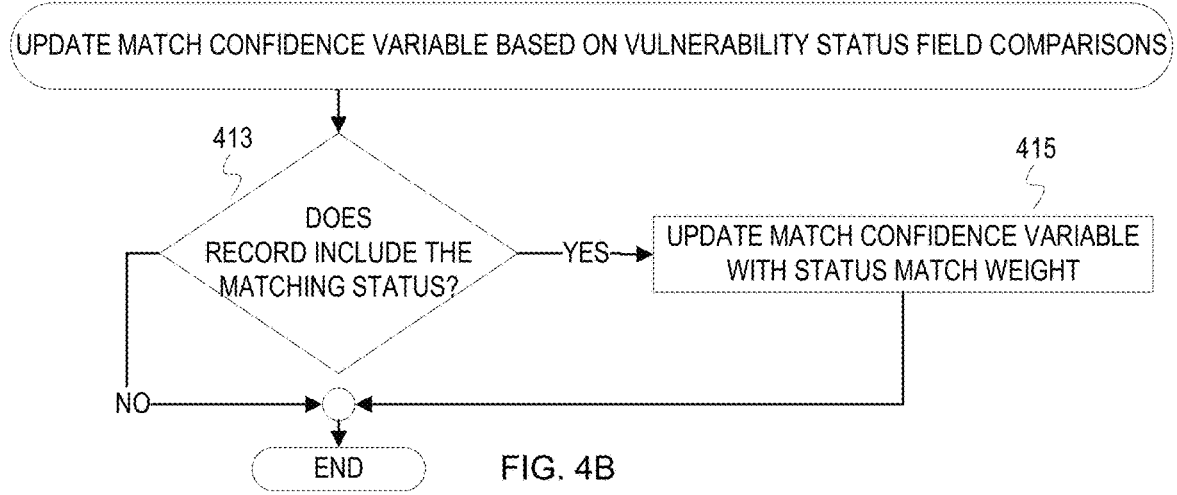
FIG. 4B depicts example operations for updating the match confidence variable of the informal vulnerability record based on vulnerability status field comparisons.

FIG. 4B depicts example operations for updating the match confidence variable of the informal vulnerability record based on vulnerability status field comparisons. At block 413, the system determines whether the informal vulnerability record indicates a vulnerability status matching the vulnerability status in the security advisory. The system uses the match assessment parameters to determine which fields of the security advisory and the informal vulnerability record correspond to vulnerability status and compares those mapped or corresponding fields. If a matching vulnerability status is found, then the system updates the match confidence variable of the currently selected informal vulnerability record with the vulnerability status match weight at block 415. If the record does not include a matching vulnerability status, then operational flow proceeds to the next compare field (e.g., block 309).

At block 309, the system updates the match confidence variable of the informal vulnerability record based on affected name field comparisons. A security advisory may conform to a data type format that has names of affected software and/or hardware components at different levels of specificity or abstraction. In some cases, a security advisory includes multiple affected names. Similar to reference link field comparisons, the system compares each affected name in the security advisory with the affected name(s) in the informal vulnerability record. Embodiments can assign different weights based on component hierarchy. For example, a system may assign a lesser match weight when a matched affected name is a platform name and a greater match weight if the affected name fields match on a file name.

Figure 4C:
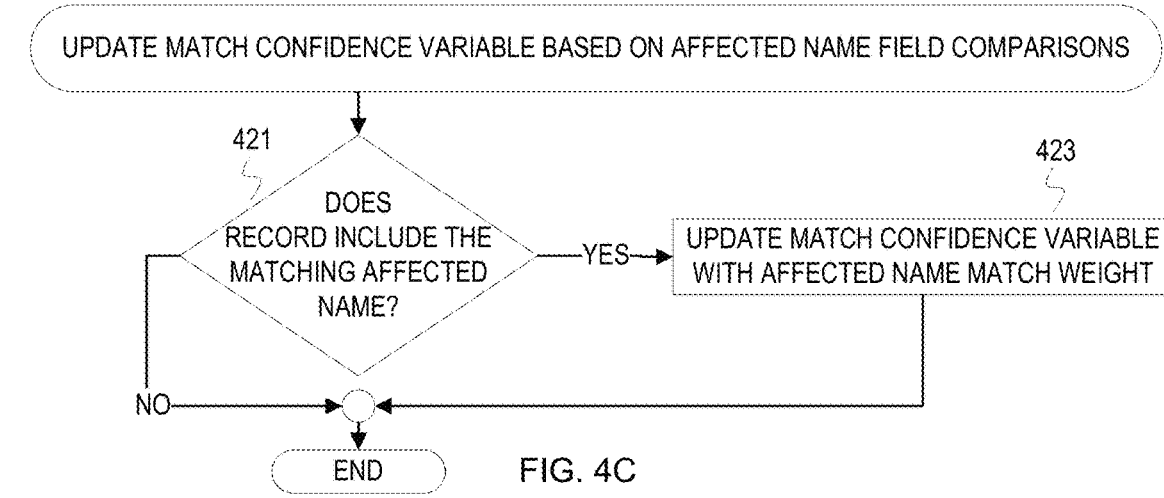
FIG. 4C depicts example operations for updating the match confidence variable of the informal vulnerability record based on affected name field comparisons.

FIG. 4C depicts example operations for updating the match confidence variable of the informal vulnerability record based on affected name field comparisons. At block 421, the system determines whether the informal vulnerability record includes an affected name matching the affected name in the security advisory. The system uses the match assessment parameters to determine which fields of the security advisory and the informal vulnerability record correspond to affected name and compares those mapped or corresponding fields. As with the reference link, the match assessment rule for affected name conditions determination of a match on identical affected name values. Implementations can configure affected name match assessment rules to allow for unintentional variations (e.g., typographical errors). For example, a match assessment rule for affected name may allow for a match without a trademark or allow for common typographical errors. If a matching affected name is found, then the system updates the match confidence variable of the currently selected informal vulnerability record with the affected name match weight at block 423. If the record does not include a matching affected name, then operational flow proceeds to the next compare field (e.g., block 313).

At block 313, the system updates the match confidence variable of the informal vulnerability record based on prose descriptions similarity. Due to the variability of prose descriptions by authors for a same vulnerability, the system has less strict similarity requirements for assigning a match weight (e.g., no requirement to be identical). Text similarity analysis is used to assess similarity of the mapped compare field values.

Figure 5A:
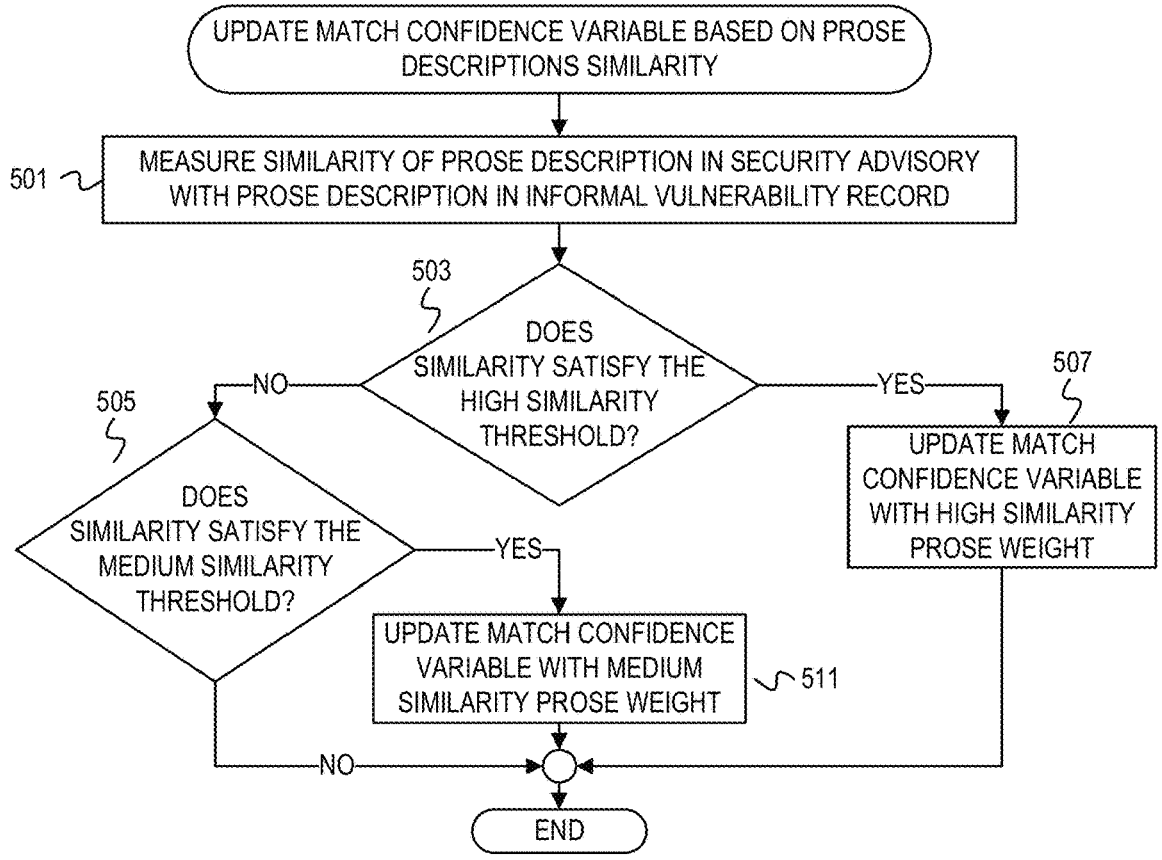
FIG. 5A depicts example operations for updating the match confidence variable of the informal vulnerability record based on prose descriptions similarity.

FIG. 5A depicts example operations for updating the match confidence variable of the informal vulnerability record based on prose descriptions similarity. At block 501, the system measures similarity of the prose description in the security advisory and the prose description in the informal vulnerability record. Text similarity can be measured based on text distance and text representation. The text distance includes length distance, distribution distance, and semantic distance. Text representation for measuring text similarity can be string-based, corpus-based, single-semantic text, multi-semantic text, and graph-structure-based. Examples of tools (i.e., libraries or application programming interfaces (APIs)) that can be used for measuring similarity of prose descriptions include the RxNLP Text Similarity API and the Gensim library. Implementations can pre-process the prose descriptions prior to measuring similarity (e.g., text cleaning and trimming).

The similarity measurement is then compared against a threshold(s) defined for satisfying the match assessment for the prose weight. This example presumes the use of a threshold for high similarity and a threshold for medium similarity. At block 503, the system determines whether the determined similarity satisfies the high similarity threshold. If so, operational flow proceeds to block 507. At block 507, the system updates the match confidence variable of the informal vulnerability record with the high similarity prose weight. If the high similarity threshold is not satisfied, then the system determines whether the similarity measurement satisfies a medium similarity threshold at block 505. If the medium similarity threshold is satisfied by the similarity measurement, then the system updates the match confidence variable of the informal vulnerability record with the medium similarity prose weight, which is likely less than the high similarity prose weight. If neither threshold is satisfied or after updating the variable, then operational flow proceeds to the next compare field (e.g., the vulnerability type field indicated in block 315).

At block 315, the system determines whether the security advisory includes an affected type value(s). A security advisory may be published with a description of vulnerability but without specifying an affected type. If no affected type is specified in the security advisory, then operational flow proceeds to block 319. If the security advisory specifies an affected type, then operational flow proceeds to block 317.

Figure 5B:
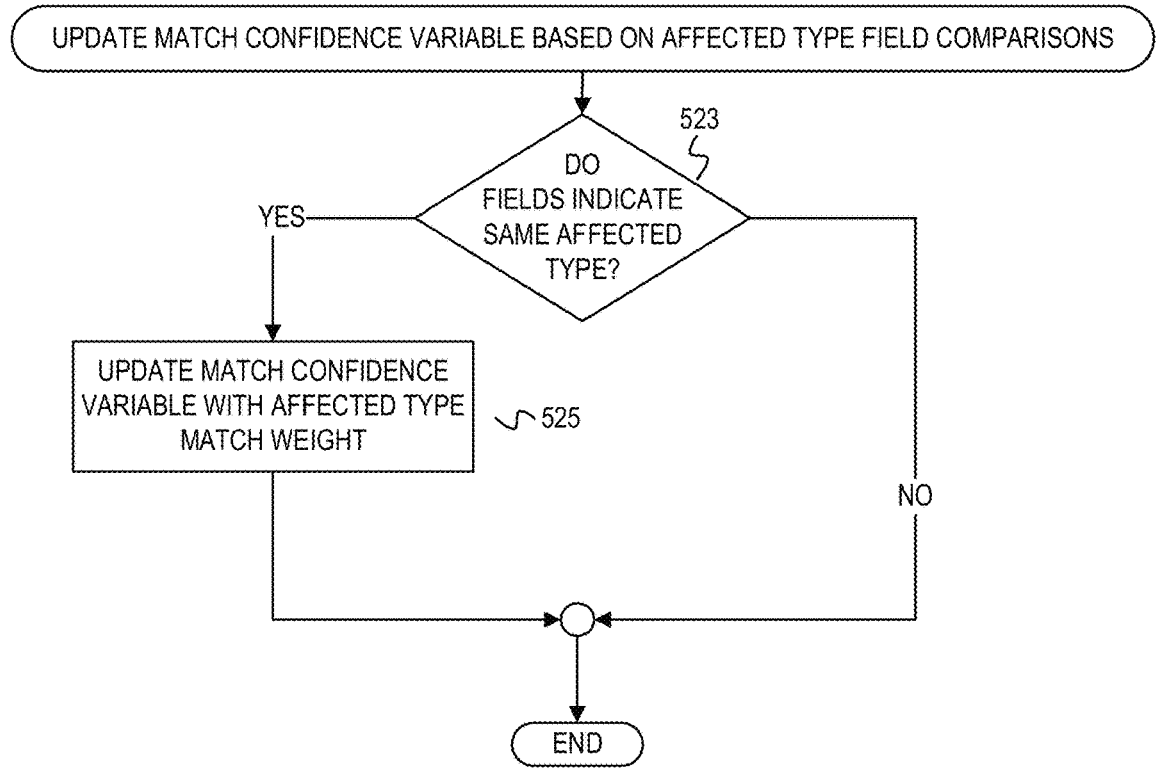
FIG. 5B depicts example operations for updating the match confidence variable of the informal vulnerability record based on vulnerability type field comparisons.

At block 317, the system updates the match confidence variable of the informal vulnerability record based on affected type field comparisons. The affected type field indicates a type of component, package, product, etc. affected by the vulnerability. For example, the affected type field can indicate an operating system, platform, or programming language FIG. 5B depicts example operations for updating the match confidence variable of the informal vulnerability record based on affected type field comparisons. At block 523, the system determines whether affected type fields of the security advisory and the informal vulnerability record indicate the same affected type. For instance, the system searches the one or more fields of the informal vulnerability record mapped to the compare field of the security advisory (i.e., affected type field) for the value assigned to the compare field in the security advisory. To assist or guide in the comparison, the system can use the official common platform enumeration (CPE) dictionary. If there is a match, then operational flow proceeds to block 525. If not, then operational flow proceeds to processing the next compare field or next informal vulnerability record, if any. At block 525, the system updates the match confidence variable of the currently selected informal vulnerability record with the affected type match weight.

At block 319, the system determines whether there is another informal vulnerability record to process for match assessment against the security advisory. If there is another record to process, then operational flow returns to block 303. Otherwise, operational flow proceeds to block 321.

At block 321, the system determines merge state for the security advisory with respect to the informal vulnerability records based on the match confidence variables. A threshold(s) is defined in the system for determination of whether the security advisory is automatically merged with an informal vulnerability record or indicated for manual examination.

Figure 6:
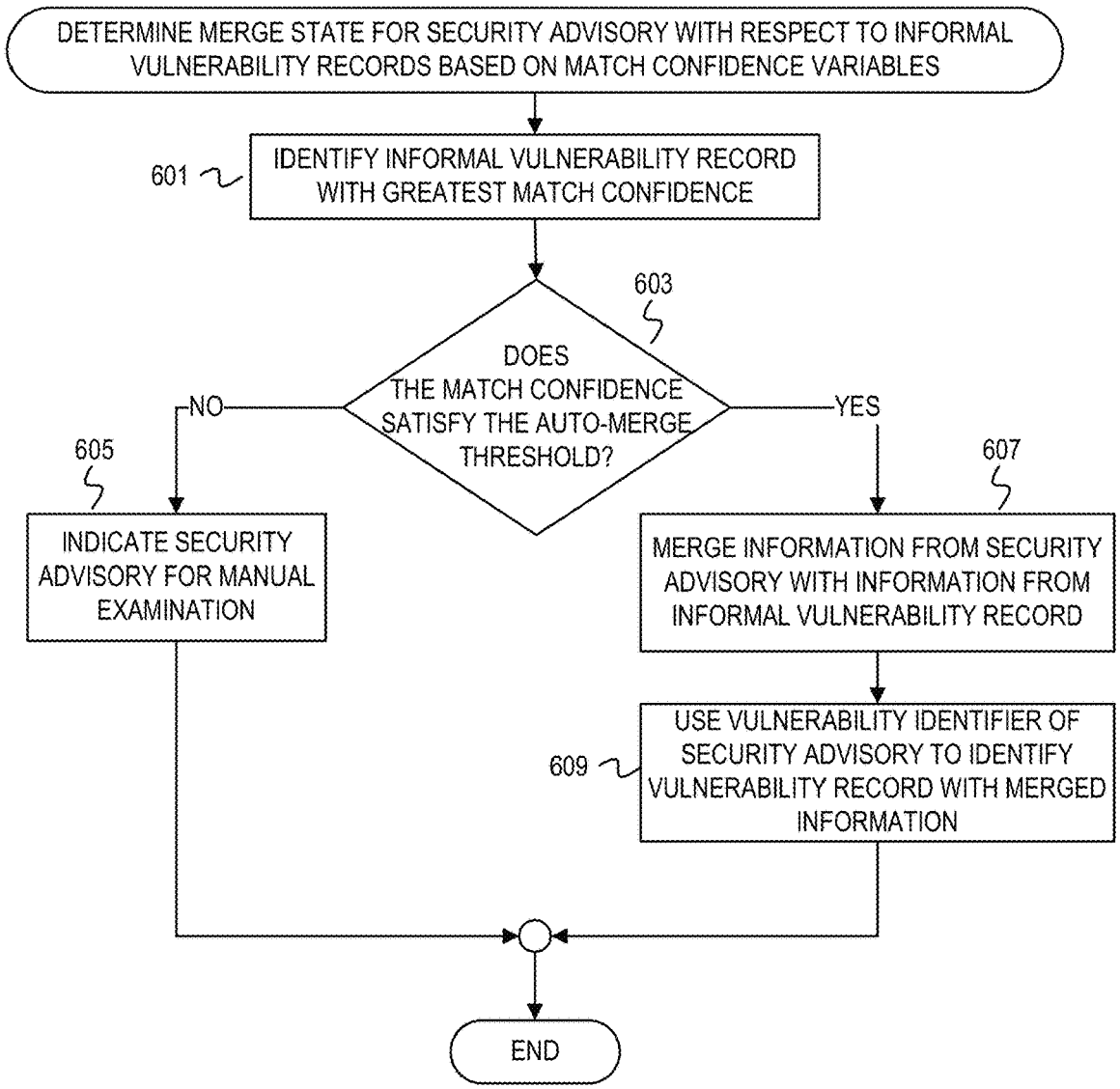
FIG. 6 depicts example operations for determining merge state for the security advisory with respect to the informal vulnerability records based on the match confidence variables.

FIG. 6 depicts example operations for determining merge state for the security advisory with respect to the informal vulnerability records based on the match confidence variables. Merge state indicates whether the security advisory matches an informal vulnerability record to a sufficient degree that the information or content can be merged automatically and the resulting merged content identified with the formal identifier of the security advisory. While embodiments may define a defer state as discussed above, the example operations of FIG. 6 are based on two states: 1) manual examination and 2) automatic merge.

At block 601, the system identifies the informal vulnerability record with the greatest match confidence. After the cumulative updating of the match confidence variable of the records with weights of the different compare fields based on varying degrees of matching/similarity, the informal vulnerability record with the match confidence variable having the greatest value represents the record with the greatest degree of similarity to the security advisory.

At block 603, the system determines whether the match confidence of the identified record satisfies an auto-merge threshold. A threshold for automatic merging of content is defined in advance. For instance, the auto-merge threshold may be 95 or 0.95 assuming a 0-100 or 0-1 confidence scale. If the auto-merge threshold is satisfied, then operational flow proceeds to block 607. If not, then operational flow proceeds to block 605.

At block 607, the system merges the information from the security advisory with the information from the informal vulnerability record. The system can update the record with information from the security advisory, update the security advisory with the information from the record, or create a new record with the merged information. For compare fields, the system can be configured to preempt the mapped fields of the informal vulnerability record with the compare fields of the security advisory. The data of the preempted field(s) may be discarded or moved into an additional field, for example a notes field or miscellaneous information field.

At block 609, the system uses the vulnerability identifier of the security advisory (i.e., the formal identifier) to identify the resulting vulnerability record with the merged information. While a cybersecurity provider can choose to preserve its informal identifier (e.g., a proprietary, non-community identifier) for the vulnerability, use of the identifier of the security advisory aligns with the community oriented analysis of vulnerabilities for fixes/solution.

If the match confidence of the identified record did not satisfy the auto-merge threshold, then at block 605 the system indicates the security advisory for manual examination. The system can move the security advisory into a queue, update a dashboard, generate a notification, etc., to indicate the security advisory is to be manual examined by cybersecurity personnel.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations for match assessment of the different fields in FIG. 3 can be performed in a different order. In addition, embodiments can specify required compare fields. If a required compare field is absent, then the security advisory is indicated for manual examination without a match assessment. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
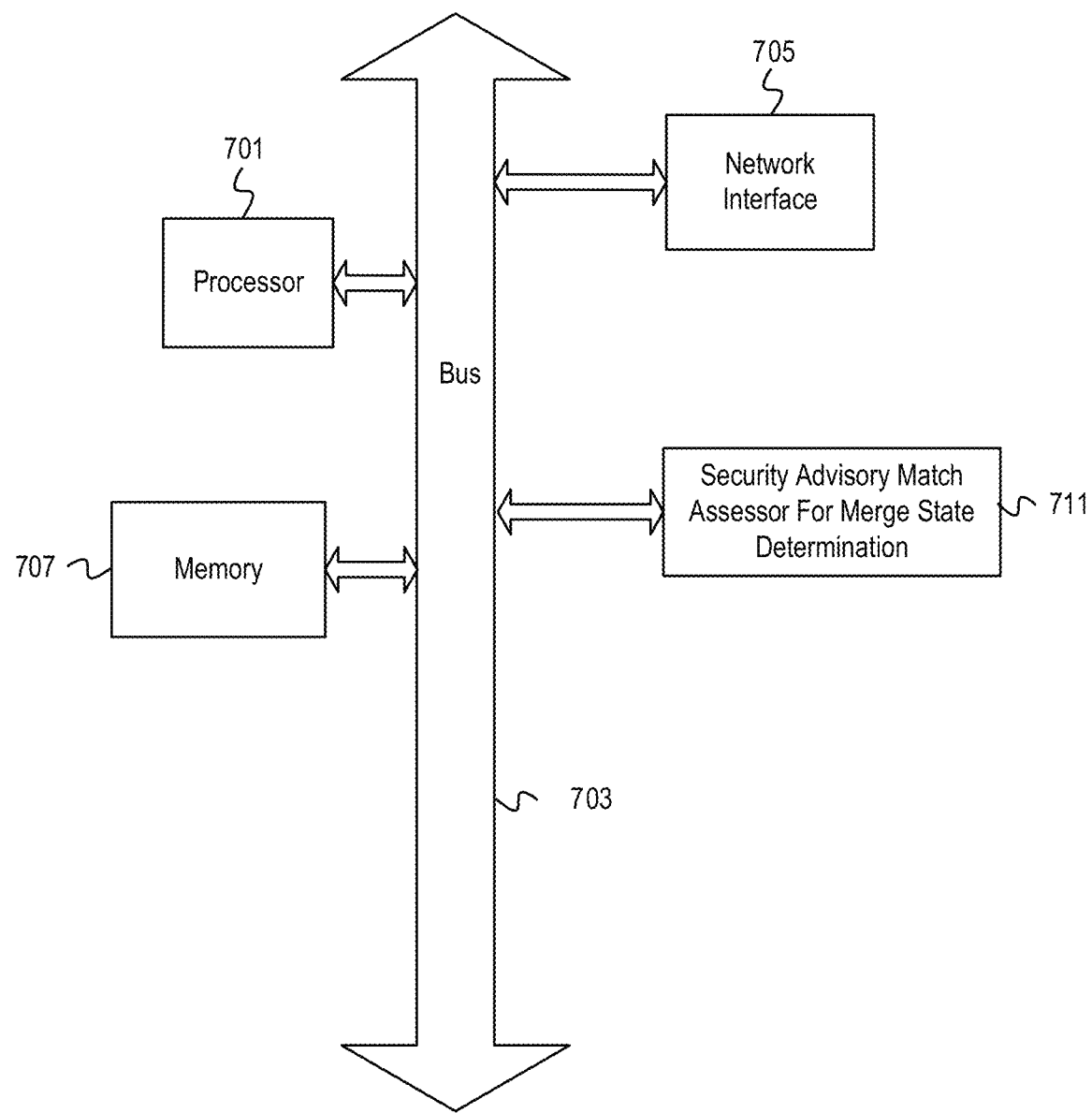
FIG. 7 depicts an example computer system with a security advisory match assessor for merge state determination.

FIG. 7 depicts an example computer system with a security advisory match assessor for merge state determination. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes a security advisory match assessor 711. The security advisory match assessor 711 assesses degree of similarity or matching of information in a security advisory with information in vulnerability records in a match assessment target list to determine whether a same vulnerability is described, and the information can be automatically merged. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

When referring to an "informally" disclosed vulnerability, the phrase does not limit the claims or description to vulnerabilities that are disclosed without conforming to any defined process. The use of the term "informal" is used to distinguish from vulnerabilities disclosed according to a process adopted by a community, such as the process defined by the CVE program.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
based on detection of a cybersecurity vulnerability update in a first publicly accessible data feed, determining likelihood that the cybersecurity vulnerability update and one of a plurality of informal cybersecurity vulnerability records describe a same cybersecurity vulnerability, wherein determining likelihood that the cybersecurity vulnerability update and one of the plurality of informal cybersecurity vulnerability records describe a same cybersecurity vulnerability comprises, for each of the plurality of informal cybersecurity vulnerability records,
assessing similarity of data of a first set of fields of the cybersecurity vulnerability update and data of a second set of fields of the informal cybersecurity vulnerability record,
wherein each of the first and second sets of fields at least comprises a prose description field,
wherein assessing similarity of data of the prose description field in the informal cybersecurity vulnerability record and the prose description field in the cybersecurity vulnerability update comprises pre-processing the prose descriptions to clean and trim text and measuring similarity based on text distance or text representation; and
updating a confidence variable of the informal cybersecurity vulnerability record based, at least in part, on assessed similarity of the data; and
identifying a first of the plurality of informal cybersecurity vulnerability records having a greatest value for the confidence variable among the plurality of informal cybersecurity vulnerability records;
determining that the confidence variable for the first informal cybersecurity vulnerability record satisfies a threshold for automatic merging;
automatically merging data from the cybersecurity vulnerability update with data from the first informal vulnerability record based on the determination that the confidence variable for the first informal cybersecurity vulnerability record satisfies the threshold for automatic merging; and
publishing a security advisory with the merged data from the first informal vulnerability record and from the cybersecurity vulnerability update identified with its common vulnerability enumerator (CVE) identifier.

2. The method of claim 1, wherein the cybersecurity vulnerability update identifies the cybersecurity vulnerability according to a community standard for vulnerability identification and the plurality of informal cybersecurity vulnerability records identify vulnerabilities differently.

3. The method of claim 1 further comprising monitoring a plurality of publicly accessible cybersecurity data feeds for updates, wherein an update indicates discovery of a cybersecurity vulnerability or updated information about a published cybersecurity vulnerability.

4. The method of claim 1, further comprising determining parsing and similarity assessment parameters for the cybersecurity vulnerability update based, at least in part, on at least one of identification of the first publicly accessible data feed and metadata of the cybersecurity vulnerability update, wherein the similarity assessment parameters indicate rules for assessing similarity of data.

5. The method of claim 1, wherein assessing similarity of data of a first set of fields of the cybersecurity vulnerability update and data of a second set of fields of the informal cybersecurity vulnerability record comprises:
determining which of a plurality of rules govern similarity assessment of a first field of the first set of fields and determining similarity of the data of the first field and a first of the second set of fields according to the determined rule; and
determining a weight to use to update the confidence variable based on the similarity assessment of the data of the first field of the first set of fields and the first field of the second set of fields according to the determined rule, wherein the determined rule specifies the weight.

6. The method of claim 5, wherein determining similarity of the data of the first field and a first of the second set of fields according to the determined rule comprises determining either an extent of similarity between the data or determining whether the data is identical depending on whether the determined rule specifies exact matching or allows for degrees of matching.

7. The method of claim 1, wherein updating a confidence variable of the informal cybersecurity vulnerability record based, at least in part, on assessed similarity of the data comprises cumulatively updating the confidence variable with weights of the first set of fields assessed as having similar data.

8. The method of claim 1, wherein the first set of fields indicate at least two of a prose description of a cybersecurity vulnerability, a vulnerability status, a type of affected component, a reference link, and an affected name.

9. A non-transitory, machine-readable medium having program code stored thereon that is executable by a computing device, the program code comprising instructions to:
determine an extent of similarity of information in a security advisory and information in each of a plurality of informal cybersecurity vulnerability records, wherein the security advisory information at least partially describes a cybersecurity vulnerability,
wherein the instructions to determine the extent of similarity of information comprise instructions to compare values of a first set of fields of the security advisory to values of a second set of fields of each of the plurality of informal cybersecurity vulnerability records to assess an extent of similarity of the values and to update a confidence variable of each of the plurality of informal cybersecurity vulnerability records with weights based on the assessments,
wherein the first and second sets of fields at least comprise prose description fields,
wherein the instructions to compare values of the prose description field of the security advisory and the prose description field of each of the plurality of informal cybersecurity vulnerability records comprise instructions to pre-process each of the prose descriptions to clean and trim text and instructions to measure similarity based on text distance or text representation between the pre-processed prose description of the security advisory and the pre-processed prose description of each of the plurality of informal cybersecurity vulnerability records, and
determine a merge state for the security advisory based, at least in part, on extent of similarity of information in the security advisory and of information in the one of the plurality of informal cybersecurity vulnerability records having greatest similarity with the security advisory as quantified by the confidence variable thereof.

10. The machine-readable media of claim 9, wherein the merge state indicates one of automatically merge and manual examination for merge determination.

11. The machine-readable media of claim 9, wherein the merge state indicates one of automatically merge, manual examination for merge determination, and defer manual examination.

12. The machine-readable media of claim 9, wherein the instructions to compare values of a first set of fields of the security advisory to values of a second set of fields of each of the plurality of informal cybersecurity vulnerability records to assess an extent of similarity of the values and to update a confidence variable of each of the plurality of informal cybersecurity vulnerability records with weights based on the assessments comprise instructions to:
for each of the first set of fields and for each of the informal cybersecurity vulnerability records,
determine a match assessment rule for the field; and
compare the value of the field to a value of a corresponding one of the second set of fields of the informal cybersecurity vulnerability record according to the match assessment rule; and
cumulatively update the confidence variable of the informal cybersecurity vulnerability record according to the match assessment rule.

13. The machine-readable media of claim 12, wherein the instructions to compare the value of the field to a value of a corresponding one of the second set of fields of the informal cybersecurity vulnerability record according to the match assessment rule comprise instructions to compare the value of the first field to the value of the corresponding one of the second set of fields of the informal cybersecurity vulnerability record to determine whether the values are identical if the match assessment rule defines extent of similarity as either an exact match or no match and conditions use of a corresponding weight on exact matching.

14. The machine-readable media of claim 12, wherein the instructions to compare the value of the field to a value of a corresponding one of the second set of fields of the informal cybersecurity vulnerability record according to the match assessment rule comprise instructions to compare the value of the field of the first set of fields to the value of the corresponding one of the second set of fields of the informal cybersecurity vulnerability record to determine extent of similarity and wherein the match assessment rule conditions use of a corresponding weight on satisfying a defined threshold of similarity.

15. The machine-readable media of claim 9, wherein the program code further comprises instructions to automatically merge the information of the security advisory and information of the one of the plurality of informal cybersecurity vulnerability records having the confidence variable with the greatest value if the merge state indicates automatic merging.

16. An apparatus comprising:
a processor; and
a computer-readable medium having instructions stored thereon that are executable by the processor to cause the apparatus to,
determine an extent of similarity of information in a security advisory and information in each of a plurality of informal cybersecurity vulnerability records, wherein the security advisory information at least partially describes a cybersecurity vulnerability,
wherein the instructions to determine the extent of similarity of information comprise instructions to compare values of a first set of fields of the security advisory to values of a second set of fields of each of the plurality of informal cybersecurity vulnerability records to assess an extent of similarity of the values and to update a confidence variable of each of the plurality of informal cybersecurity vulnerability records with weights based on the assessments,
wherein the first and second sets of fields at least comprise prose description fields,
wherein the instructions to compare values of the prose description field of the security advisory and the prose description field of each of the plurality of informal cybersecurity vulnerability records comprise instructions to pre-process each of the prose descriptions to clean and trim text and instructions to measure similarity based on text distance or text representation between the pre-processed prose description of the security advisory and the pre-processed prose description of each of the plurality of informal cybersecurity vulnerability records; and
determine a merge state for the security advisory based, at least in part, on extent of similarity of information in the security advisory and of information in the one of the plurality of informal cybersecurity vulnerability records having greatest similarity with the security advisory as quantified by the confidence variable of the one informal cybersecurity vulnerability.

17. The apparatus of claim 16, wherein the merge state indicates one of automatically merge, manual examination for merge determination, and defer manual examination.

18. The apparatus of claim 16, wherein the instructions to compare values of a first set of fields of the security advisory to values of a second set of fields of each of the plurality of informal cybersecurity vulnerability records to assess an extent of similarity of the values and to update a confidence variable of each of the plurality of informal cybersecurity vulnerability records with weights based on the assessments comprise instructions to:
for each of the first set of fields and for each of the informal cybersecurity vulnerability records,
determine a match assessment rule for the field; and
compare the value of the field to a value of a corresponding one of the second set of fields of the informal cybersecurity vulnerability record according to the match assessment rule; and cumulatively update the confidence variable of the informal cybersecurity vulnerability record according to the match assessment rule.

19. The apparatus of claim 18, wherein the instructions to compare the value of the field to a value of a corresponding one of the second set of fields of the informal cybersecurity vulnerability record according to the match assessment rule comprise instructions to compare the value of the first field to the value of the corresponding one of the second set of fields of the informal cybersecurity vulnerability record to determine whether the values are identical if the match assessment rule defines extent of similarity as either an exact match or no match and conditions use of a corresponding weight on exact matching.

20. The apparatus of claim 18, wherein the instructions to compare the value of the field to a value of a corresponding one of the second set of fields of the informal cybersecurity vulnerability record according to the match assessment rule comprise instructions to compare the value of the first field to the value of the corresponding one of the second set of fields of the informal cybersecurity vulnerability record to determine extent of similarity and wherein the match assessment rule conditions use of a corresponding weight on satisfying a defined threshold of similarity.

\* \* \* \* \*